A. SORDI.
ELASTIC WHEEL FOR AUTOMOBILES AND OTHER VEHICLES.
APPLICATION FILED MAY 9, 1911.
1,048,904.
Patented Dec. 31, 1912.
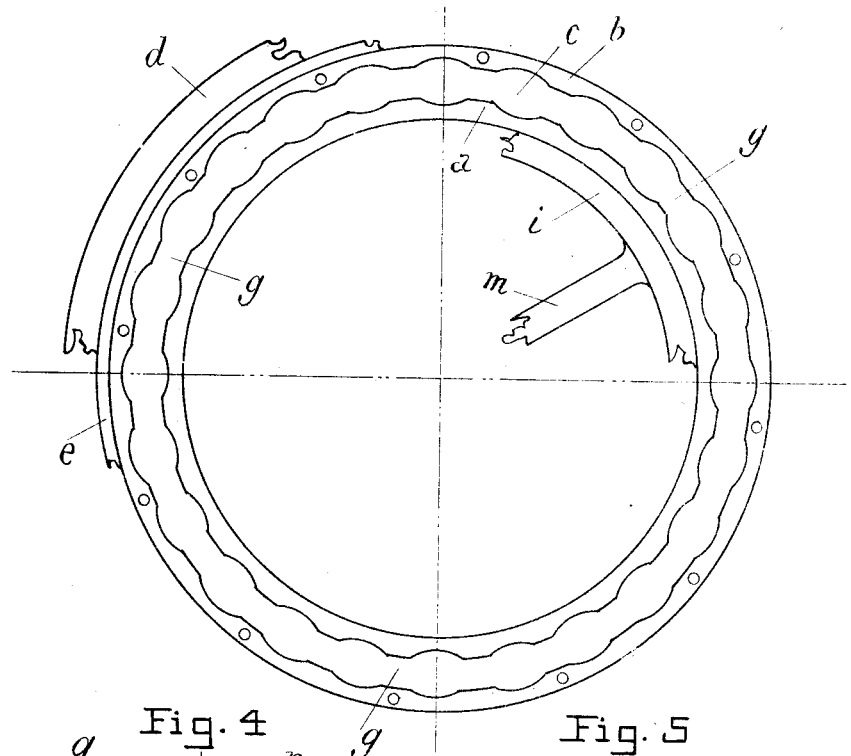
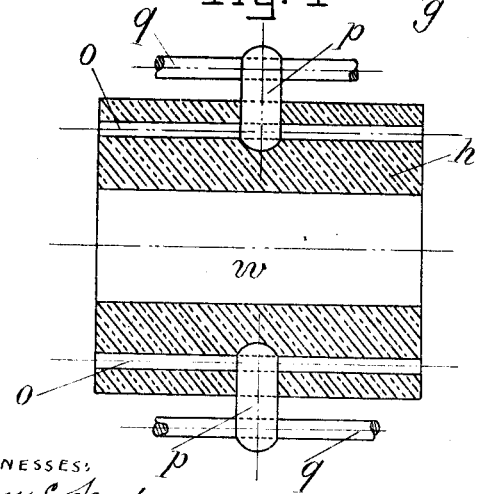
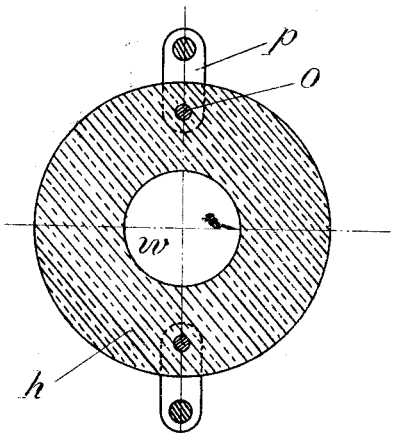

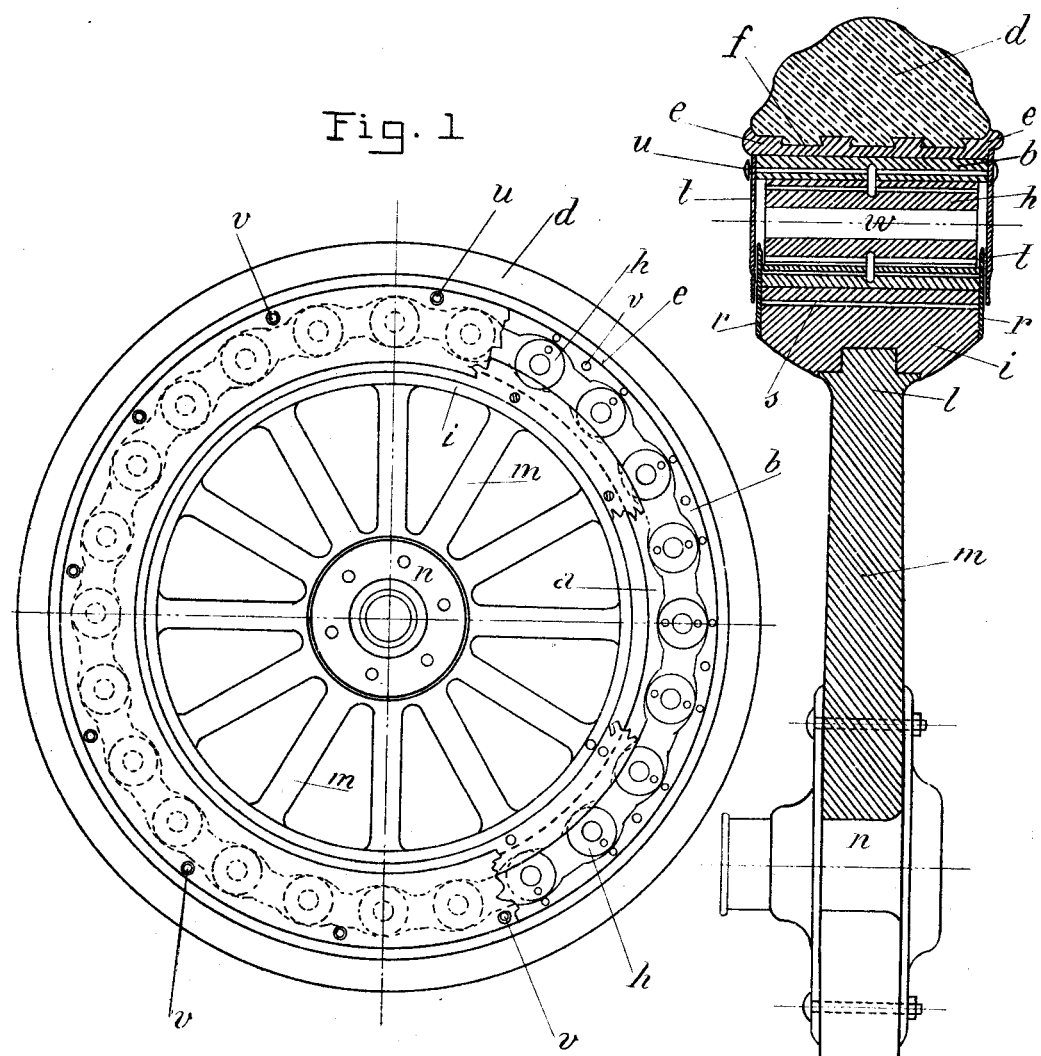

UNITED STATES PATENT OFFICE.

ARTURO SORDI, OF LUGANO, SWITZERLAND.

ELASTIC WHEEL FOR AUTOMOBILES AND OTHER VEHICLES.

1,048,904. Specification of Letters Patent. Patented Dec. 31, 1912.

Application filed May 9, 1911. Serial No. 626,006.

*To all whom it may concern:*

Be it known that I, ARTURO SORDI, a subject of the King of Italy, residing at Lugano, Switzerland, have invented new and useful Improvements in New Elastic Wheels for Automobiles and other Vehicles, of which the following is a specification.

The invention forming the subject of the present application relates to various improvements in wheels which are specially intended for the class of vehicles to be driven at high speeds and for light vehicles, and is hereinafter described and illustrated in the accompanying drawings, in which—
Figure 1 is a side elevation of the wheel with a part in internal section. Fig. 2 a transverse section of the wheel. Fig. 3 illustrates the aluminium rings $a$ and $b$ with which the wheel is provided in side elevation, such rings being formed on one of their faces with recesses $c$ constituting seats; Fig. 4 is a longitudinal side section of one of the india rubber cylinders $h$ fitted with a metallic attaching connection to be hereinafter described. Fig. 5 is a transverse front section of one of said cylinders $h$.

In these figures $d$ is a solid india rubber tire, applied to the steel rim $e$, and secured by means of dovetailed projections $f$. The ring $b$ is of aluminium and on its inner face it is formed with recesses $c$ constituting seats corresponding in position to seats formed on the outer face of the aluminium ring $a$, as shown in Fig. 3. Between these seats is an intervening space $g$, $g_*$, of the form illustrated in the drawing, into which the india rubber cylinders $h$ are introduced with their axes at right angles to the face of the wheel.

The inner face of the ring $a$ is by means of screws secured to a wooden ring $i$, to which by means of the projections $l$ the spokes $m$ of the wheel are attached, terminating in a removable metallic hub $n$.

The Figs. 4 and 5 illustrate the method in which the cylinders shown in Fig. 3 are arranged in the seats $c$. The pivots $o$ inserted in specially formed openings in the cylinders pass through a small pin $p$, the extremity of which is traversed by other pivots $q$, and articulated to the two rings $a$ and $b$. To the two sides of the rim $i$ by means of pivots $s$, two bronze plates $r$ are secured, the faces of which have the geometrical figure of a circular crown. These plates $r$ are in frictional contact with the steel plates $t$ of the same form. They are secured to the ring $b$ by means of bolts $u$. The plate $t$ situated on the right hand side looking at Fig. 2, is of larger diameter than that of the ring $b$ and is seated in a recess in the rim $e$, whereas that on the left hand is of an outer diameter equal to that of the ring $b$. The nuts $v$ of the bolts $u$ are situated on the side of this latter circular crown (left hand). Four of these bolts beneath their nuts carry a washer, one part of the diameter of which bears on the side of the rim $e$, and in a specially formed recess. This system permits of the rim $e$ being removed as rapidly as possible, when the india rubber tire $d$ has to be renewed, without having to dismount the wheel, or to remove the circular crowns, which is due to the four nuts $v$ of the bolts $u$ fitted with washers, which hold them in place, preventing all movement of it.

The elasticity of the wheel described is insured by the cylinders $h$ by reason of same being of india rubber and that they are provided with a central opening $w$, which permits of the maximum flattening movement. The recesses $c$ constituting seats situated between the two rings $b$ and $a$ and inclosing the cylinders, present very important advantages.

The operation of the wheel is as follows:—
Owing to the pressure which is exerted on the hub $n$ of the wheel by the axle of the vehicle, when in action, an appreciable internal distortion of the wheel is occasioned; in other words, the ring $a$ rigidly connected to the hub, transmits the pressure of the vehicle to the cylinders $h$ situated below the hub; these cylinders flatten under the weight they support, whereas the cylinders situated laterally, that is to say in a direction at right angles to that in which the lowering occurs, are compelled to support the weight owing to the seats, the angles of which being displaced cause said cylinders to become distorted. The upper cylinders $h$ on the contrary that is to say those which are situated in a position superior to the hub $n$ of the wheel, remain inactive owing to the increase of the width of the space $c$, that is to say of the space between the rings $b$ and $a$; but, on the other hand, owing to the lowering of the ring $a$ they are caused to elongate being fixed to said rings $b$ and $a$ by the arrangement illustrated in Figs. 4 and 5. In its rotary displacement the wheel affords great elasticity, while preventing, however, the ring $a$ turning independently of ring $b$. This is verified owing to the said seats which are displaced in a contrary direction to each other and exert pressure at their angles on all the cylinders $h$. The openings $w$ of said cylinders $h$ permit of the adjustment of the elasticity of the wheel to suit the weight of the vehicle to which the wheel is applied; this adjustment is obtained by making the openings smaller or larger.

What I claim as my invention, and desire to secure by Letters Patent, is—

In a wheel for automobiles and other vehicles, in combination, two concentric rings spaced from one another, a tire secured to the outer surface of the outer ring, the inner ring being secured to the hub of the wheel, the oppositely disposed faces of said rings being provided with annular members having recesses formed therein, the recesses in said annular members registering with one another in pairs, hollow resilient cylinders positioned between said members, there being one cylinder engaging each of said pairs of recesses, said cylinders having their longitudinal axes parallel to the axis of rotation of the wheel, longitudinally disposed pivots positioned within said cylinders adjacent their inner and outer surfaces, pivots positioned within said annular members and extending in parallelism with the pivots in the cylinders, and pins connecting the pivots in the outer and inner members with the pivots adjacent the outer and inner surface of the cylinders respectively.

In testimony whereof I have signed my name to this specification in the presence of two subscribing witnesses.

ARTURO SORDI. [L. S.]

Witnesses:
  CHARLES L. BOLOQUIN,
  BENNETT MANNING.